US012806983B2

(12) United States Patent
Nam et al.

(10) Patent No.: US 12,806,983 B2
(45) Date of Patent: Nov. 24, 2026

(54) VEHICLE DOOR WITH A SEALING STRUCTURE

(71) Applicants: HYUNDAI MOTOR COMPANY, Seoul (KR); KIA CORPORATION, Seoul (KR)

(72) Inventors: Yong-Hyun Nam, Hwaseong-si (KR); Seung-Il Choi, Hwaseong-si (KR); Sun-Ho Heo, Suwon-si (KR); Min-Hyo Kim, Hanam-si (KR); Kyu-Jin Kim, Bucheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/965,323

(22) Filed: Dec. 2, 2024

(65) Prior Publication Data

US 2025/0319756 A1 Oct. 16, 2025

(30) Foreign Application Priority Data

Apr. 16, 2024 (KR) ........................ 10-2024-0050728

(51) Int. Cl.
*B60J 10/86* (2016.01)
*B60J 10/40* (2016.01)
*B60J 10/76* (2016.01)

(52) U.S. Cl.
CPC ............... *B60J 10/86* (2016.02); *B60J 10/40* (2016.02); *B60J 10/76* (2016.02)

(58) Field of Classification Search
CPC ........ B60J 5/0477; B60J 5/0479; B60J 10/86; B60J 10/22; B60J 10/76; B60J 10/24
See application file for complete search history.

(56) References Cited

U.S. PATENT DOCUMENTS

| | | | | |
|---|---|---|---|---|
| 7,325,859 B1 * | 2/2008 | Brancaleone | ............ | B60J 10/84 49/489.1 |
| 8,360,504 B2 * | 1/2013 | Masumoto | ............... | B60J 10/25 296/147 |
| 10,384,519 B1 * | 8/2019 | Brown | .................. | E05F 15/649 |
| 2001/0017006 A1 * | 8/2001 | Saito | ........................ | B60J 10/80 296/147 |

(Continued)

FOREIGN PATENT DOCUMENTS

| | | | |
|---|---|---|---|
| JP | 4402550 | * | 11/2009 |
| JP | 6194904 | * | 8/2017 |
| KR | 200344140 Y1 | | 3/2004 |

*Primary Examiner* — Gregory J Strimbu
(74) *Attorney, Agent, or Firm* — Lempia Summerfield Katz LLC

(57) ABSTRACT

A vehicle door with a sealing structure includes: a first door having one end hinge-connected to a vehicle; a second door having one end in contact with the other end of the first door and the other end hinge-connected to the vehicle; a door outer parting seal adjacent to and in contact with an outer surface of the first door; a door side weather strip installed on the first door and in contact with a front end of the second door, wherein the door side weather strip is positioned more inside the vehicle than the door outer parting seal; and a door inner parting seal installed on the second door and in contact with the first door, wherein the door inner parting seal is positioned more inside the vehicle than the door side weather strip.

19 Claims, 10 Drawing Sheets

(56) References Cited

U.S. PATENT DOCUMENTS

| | | | | |
|---|---|---|---|---|
| 2003/0204999 | A1* | 11/2003 | George | B60J 5/047 49/216 |
| 2015/0231954 | A1* | 8/2015 | Ryu | B60R 13/043 49/469 |
| 2015/0360547 | A1* | 12/2015 | Ogawa | B60J 10/84 49/368 |
| 2017/0182871 | A1* | 6/2017 | Taketomo | B60J 10/25 |
| 2020/0189372 | A1* | 6/2020 | Lee | B60J 10/40 |
| 2020/0300018 | A1* | 9/2020 | Kamitani | B60J 10/25 |
| 2025/0003280 | A1* | 1/2025 | Kunz | B60J 10/77 |
| 2025/0108680 | A1* | 4/2025 | Ahmed | B60J 10/86 |

* cited by examiner

VEHICLE DOOR WITH A SEALING STRUCTURE

CROSS-REFERENCE TO RELATED APPLICATION

This application claims priority to Korean Patent Application No. 10-2024-0050728, filed on Apr. 16, 2024, which is incorporated herein by reference in its entirety.

BACKGROUND

Technical Field

The present disclosure relates to a vehicle door with a sealing structure in which a rear end of a rear door is hinge-connected to a vehicle body without a center pillar.

Description of Related Art

Typically, vehicles use swing doors in which front ends of front and rear doors are hinge-connected to a vehicle body.

Some vehicles use a so-called coach door in which a front door has a front end hinge-connected to a vehicle body but a rear door has a rear end hinge-connected to the vehicle body, and then the front and rear doors are opened and closed in opposite directions to each other. The coach door has an advantage of allowing passengers in rear seats to easily get on and off.

In particular, among vehicles to which the coach door is applied, a rear end of a front door is in direct contact with a front end of a rear door without a center pillar, thereby maximizing a sense of openness.

When the center pillar is applied, a perimeter of the front door and a perimeter of the rear door are in close contact with the vehicle body and sealed at the center pillar. However, when the center pillar is not applied in the vehicle, a rear end of the front door should be in contact with a front end of the rear door to be sealed, and in particular, the front door and the rear door should be opened and closed independently for convenience when a passenger is getting in and off, thereby leaving a sealing problem therebetween.

As described above, when the rear end of the front door and the front end of the rear door are not sealed in the vehicle to which the coach door is applied, moisture or noise is introduced from the outside into a passenger compartment. In particular, as electric vehicles have been expanding in use, and since the electric vehicles do not use engines, road noise generated between tires and a road surface is introduced into the passenger compartment while traveling, which is a factor that impairs a quiet and comfort driving of the vehicle.

SUMMARY

The present disclosure has been provided to solve the above problems and is directed to providing a sealing structure of a coach door in which a front door and a rear door may be firmly sealed in a vehicle to which the coach door is applied without a center pillar.

According to an embodiment of the present disclosure, a vehicle door with a sealing structure may include: a first door having a first end and a second end. The first end may be hinge-connected to a vehicle body. The vehicle door may also include a second door having a third end and a fourth end. The third end may be in contact with the second end of the first door, and the fourth end is hinge-connected to the vehicle body. The vehicle door may further include a door outer parting seal installed on the second door. The door outer parting seal may be adjacent to and in contact with an outer surface of the first door. The vehicle door may also include a door side weather strip installed on the first door and in contact with the third end of the second door. The door side weather strip may be positioned more inside the vehicle than the door outer parting seal. The vehicle door may further include a door inner parting seal installed on the second door and in contact with the first door. The door inner parting seal may be positioned more inside the vehicle than the door side weather strip.

When both the first door and the second door are closed, the door outer parting seal, the door side weather strip, and the door inner parting seal may seal a gap between the second end of the first door and the third end of the second door. The door outer parting seal, the door side weather strip, and the door inner parting are positioned sequentially from an outside to an inside of the vehicle with intervals.

When both the first door and the second door are closed, the door outer parting seal may be in contact with a portion adjacent to an outer end portion of the first door.

A portion of the second door in contact with the door side weather strip may be formed convexly toward the door side weather strip.

A portion of the first door in contact with the door inner parting seal may be formed convexly toward the door inner parting seal.

The door inner parting seal may be formed or disposed to have an interval with the door outer parting seal within a predetermined distance to an upper end of the second door. The interval may become smaller toward an upper portion of the second door.

The door inner parting seal may converge into the door outer parting seal at the upper end of the second door.

When both the first door and the second door are closed, an upper end of the door inner parting seal may be in contact with the door side weather strip.

When both the first door and the second door are closed, an upper end of the door side weather strip may be in contact with the door outer parting seal.

A width of the door inner parting seal may be formed to become smaller toward an end portion of the door inner parting seal in a longitudinal direction of the vehicle.

The door outer parting seal and the door inner parting seal may be formed convexly toward the first door. The door side weather strip may be formed convexly toward the second door. When the first door and the second door are closed, the door outer parting seal, the door side weather strip, and the door inner parting seal may be deformed to seal a gap between the first door and the second door.

A cross section of the second end of the first door is formed to move away from the fourth end of the second door toward the inside of the vehicle. A cross section of the third end of the second door is formed to be closer to the first end of the first door toward the inside of the vehicle.

A drainage guide groove guiding moisture to flow downward between the door inner parting seal and the door side weather strip may be formed in an upper portion of the door inner parting seal.

An anti-pinch sensor installation groove in which an anti-pinch sensor is installed may be formed inside the door outer parting seal.

A vehicle body panel of the vehicle in contact with an upper end of the first door and an upper end of the second door may have a constant cross section in the longitudinal direction of the vehicle.

Upper end s of the first door and the second door may each be sealed by a glass run supporting a door glass, a door side weather strip installed on a door panel, and a body side weather strip installed on a vehicle body panel and in contact with an inner cover fitted into the door panel.

Lower end s of the first door and the second door may each be sealed by a body side weather strip installed on a vehicle body panel and in contact with a door trim, a door side weather strip installed on a door panel and in contact with the vehicle body panel, and a lower seal installed at a lower end of the vehicle body panel and in contact with the first door or the second door.

The vehicle door may be a coach door in which the first and second door are opened and closed in opposite directions to each other.

The first door may be a front door having a front end hinge-connected to the vehicle, and the second door may be a rear door having a rear end hinge-connected to rotate after sliding.

The first door is a front door having a front end hinge-connected to rotate after sliding, and the second door is a rear door having a rear end hinge-connected to the vehicle.

According to the vehicle door with the sealing structure of an embodiment of the present disclosure having the above configuration, in the vehicle to which the vehicle door is applied without the center pillar, although the front door and the rear door may be independently opened and closed, the front door and the rear door may be sealed, thereby preventing noise or moisture from introducing into an interior passenger compartment from outside the vehicle.

Since the door is sealed in triple locations from the outside of the vehicle, it is possible to completely block external noise or moisture from flowing into the interior.

In particular, it is possible to prevent an introduction of external noise, thereby further improving the quietness of the vehicle. Although electric vehicles do not generate noise due to the operation of the engine, noise generated between the tires and the road surface flows into the passenger compartment while traveling, which impairs a quiet and comfort drive feeling of the vehicle. However, it is possible to block road noise at triple sealing locations, thereby improving the quietness of the vehicle while traveling.

The statements in this Background section merely provide background information related to the present disclosure and may not constitute prior art.

Figure 1:
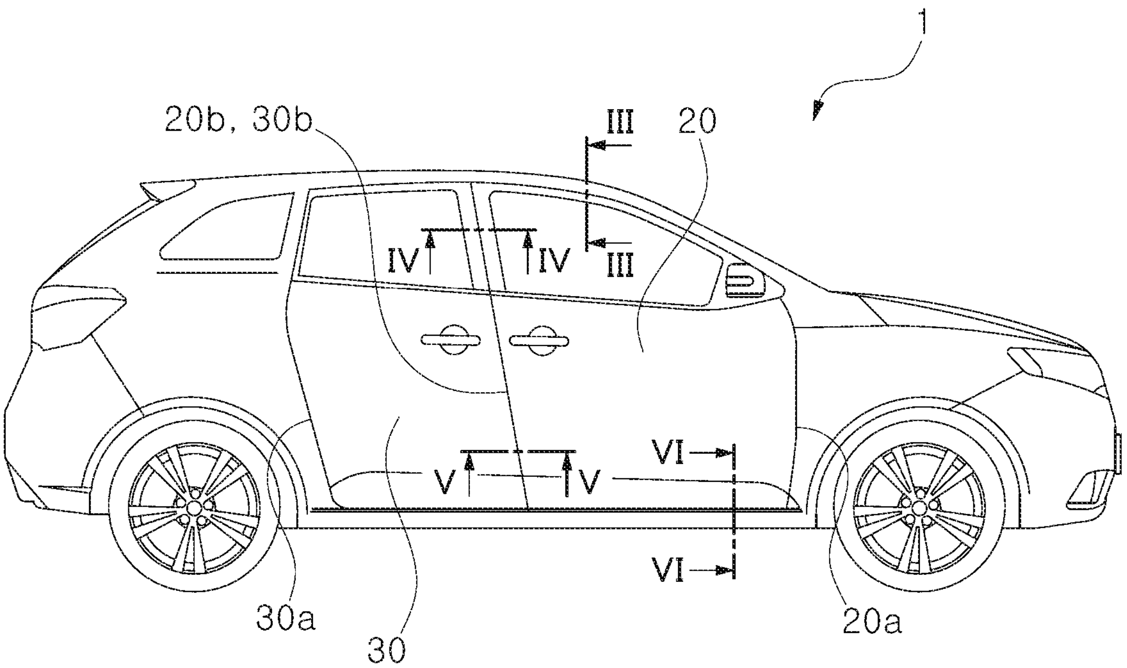
FIG. 1 is a side view showing a state in which a front door and a rear door are closed in a vehicle to which a sealing structure according to an embodiment of the present disclosure is applied.

The drawings described herein are for illustration purposes only and are not intended to limit the scope of the present disclosure in any way.

DETAILED DESCRIPTION

Hereinafter, a vehicle door with a sealing structure according to an embodiment of the present disclosure is described in detail with reference to the accompanying drawings. When a component, device, element, or the like of the present disclosure is described as having a purpose or performing an operation, function, or the like, the component, device, element, or the like should be considered herein as being "configured to" meet that purpose or perform that operation or function.

A vehicle door 10 with a sealing structure according to an embodiment of the present disclosure includes a first door 20 having a first end 20*a* hinge-connected to a vehicle 1, a second door 30 having a third end 30*b* in contact with a second end 20*b* of the first door 20 and a fourth end 30*a* hinge-connected to the vehicle 1, a door outer parting seal 33 installed on the second door 30 and adjacent to and in contact with an outer surface of the first door 20, a door side weather strip 26 installed on the first door 20 and in contact with a front end of the second door 30 inside the vehicle 1 more than the door outer parting seal 33, and a door inner parting seal 34 installed on the second door 30 and in contact with the first door 20 inside the vehicle 1 more than the door side weather strip 26.

The sealing structure according to an embodiment of the present disclosure may seal the first door 20 and the second door 30, which are opened and closed in opposite directions, at a multiple locations from the outside of the vehicle 1 when the first door 20 and the second door 30 are closed, thereby improving sealing performance.

Hereinafter, an embodiment where the first door 20 becomes the front door 20 of the vehicle 1, and the second door 30 becomes the rear door 30 of the vehicle 1 is described as an example.

The first door 20 may have a first end 20*a* hinge-connected to the vehicle 1 and a second end 20*b* rotating about the first end 20*a*.

The second door 30 may have a third end 30*b* in contact with the second end 20*b* of the first door 20 and a fourth end 30*a* hinge-connected to the vehicle 1 when the first door 20 and the second door 30 are closed. The second door 30 rotates about the fourth end 30*a*.

Since the first door 20 and the second door 30 become the front door 20 and the rear door 30 of the vehicle 1, the front door 20 may have a front end, i.e., a first end 20*a* hinge-connected to the vehicle body of the vehicle 1, and the rear door 30 may have a rear end, i.e., a fourth end 30*a* hinge-connected to the vehicle body of the vehicle 1. The front door 20 rotates about the front end 20*a*, and the rear door 30 rotates about the rear end 30*a* to open and close.

Since the vehicle door 10 such as a coach door does not have a center pillar, when the front door 20 and the rear door

30 are closed, a rear end, i.e., a second end 20*b* of the front door 20 is in contact with a front end, i.e., a third end 30*b* of the rear door 30.

The front door 20 and the rear door 30 may be opened or closed independently regardless of an order of opening or closing.

The front door 20 may have the rear end 20*b* formed to be stepped or inclined in a forward direction of the vehicle 1, and the rear door 30 has the front end 30*b* formed to be stepped or inclined in a forward direction of the vehicle 1. In other words, the front door 20 has a cross section formed to move away from the rear end 30*a* of the rear door 30 toward the inside of the vehicle 1, and the rear door 30 has a cross section formed to be closer to the front end 20*a* of the front door 20 toward the inside of the vehicle 1. For example, a cross section of the second end of the first door is formed to move away from the fourth end of the second door toward the inside of the vehicle, and a cross section of the third end of the second door is formed to be closer to the first end of the first door toward the inside of the vehicle.

The front end 20*a* of the front door 20 is simply hinge-connected to the vehicle 1 to be rotated to open and close (see curved arrows in FIGS. 4 and 5), but the rear end 30*a* of the rear door 30 is hinge-connected to rotate after sliding a predetermined distance (see linear arrows in FIGS. 4 and 5) so that the front end 30*b* of the rear door 30 is separated from the rear end 20*b* of the front door 20. Therefore, the front door 20 and the rear door 30 may be opened or closed independently regardless of an order of opening or closing. Since the front door 20 is opened and closed more frequently than the rear door 30, the front end 20*a* of the front door 20 is simply hinge-connected to the vehicle 1, and the rear end 30*a* of the rear door 30 is hinge-connected to rotate after sliding. Of course, conversely, the front end 20*a* of the front door 20 is hinge-connected to rotate after sliding, and the rear end 30*a* of the rear door 30 may be simply hinge-connected to the vehicle 1.

In addition, to prevent external noise or moisture from introducing into the interior of the vehicle 1, a plurality of sealing members are applied between the rear end 20*b* of the front door 20 and the front end 30*b* of the rear door 30.

Specifically, the door outer parting seal 33, the door side weather strip 26, and the door inner parting seal 34 may be applied sequentially with intervals from the outside of the vehicle 1. In other words, there are an interval between the door outer parting seal and the door side weather strip, and an interval between the door side weather strip and the door inner parting. Therefore, it is possible to block external noise or moisture multiple times, i.e., three times. Since the door outer parting seal 33, the door side weather strip 26, and the door inner parting seal 34 are formed of a flexible material such as synthetic rubber and a convex shape, when the front door 20 and the rear door 30 are closed, the door outer parting seal 33, the door side weather strip 26, and the door inner parting seal 34 may be deformed to seal a gap between the front door 20 and the rear door 30.

Since the front door 20 and the rear door 30 include door panels 21 and 31 and door trims 23 and 32 coupled to the door panels 21 and 31, the door outer parting seal 33, the door side weather strip 26, and the door inner parting seal 34 may be in direct contact with the door panels 21 and 31 or in contact with the door trims 23 and 32.

The door outer parting seal 33 may be installed on the second door 30 of the first door 20 and the second door 30 and may be adjacent to and in contact with the outer surface of the first door 20 of the first door 20 and the second door 30. In other words, the door outer parting seal 33 may be installed at the front end 30*b* of the rear door 30 and is adjacent to and in contact with the outer surface of the front door 20. When the front door 20 and the rear door 30 are closed, the door outer parting seal 33 may be in contact with the inside of a portion adjacent to the outer surface of the front door 20. For example, the door outer parting seal 33 may be fixed to the door panel 31 of the rear door 30 and in contact with the portion adjacent to the outer surface of the front door 20 to seal an outermost part between the front door 20 and the rear door 30. The door outer parting seal 33 may be in contact with a garnish fitted into the door panel 21 of the front door 20.

Since the door outer parting seal 33 seals the outermost part between the front door 20 and the rear door 30, the door outer parting seal 33 may be provided with an anti-pinch sensor (not shown) for detecting whether a passenger's body is stuck between the front and rear doors 20 and 30 when the front door 20 and the rear door 30 are closed. In other words, an anti-pinch sensor installation groove 33*a* in which the anti-pinch sensor is installed inside the door outer parting seal 33 may be formed to allow the anti-pinch sensor to be installed in the anti-pinch sensor installation groove 33*a* to detect whether the passenger's body is stuck between the front and rear doors 20 and 30.

The door side weather strip 26 may be installed on the first door 20 on which the door outer parting seal 33 is not installed of the first door 20 and the second door 30. The door side weather strip 26 may be located inside the vehicle 1 more than the door outer parting seal 33 and in contact with the door 30 on which the door outer parting seal 33 is installed.

In other words, the door side weather strip 26 may be installed at the rear end of the front door 20 and may be in contact with the front end 30*b* of the rear door 30. Since the door side weather strip 26 is located inside the vehicle 1 more than the door outer parting seal 33, a gap between the front door 20 and the rear door 30 is additionally sealed inside the door outer parting seal 33.

A portion in contact with the door side weather strip 26 of the rear door 30 may be formed convexly toward the door side weather strip 26. A portion in contact with the door side weather strip 26 of the door panel 31 of the rear door 30 may be formed in a convex and bent shape and may be in contact with the convex door side weather strip 26 to seal a gap therebetween.

The door inner parting seal 34 may be installed on the door 30 on which the door outer parting seal 33 is installed of the first door 20 and the second door 30 and may be in contact with the first door 20 of the first door 20 and the second door 30.

In other words, the door inner parting seal 34 may be installed on the rear door 30 like the door outer parting seal 33. However, the door inner parting seal 34 may seal a gap between the front door 20 and the rear door 30 inside the vehicle more than the door side weather strip 26.

A portion in contact with the door inner parting seal 34 of the front door 20 may be formed to be convex toward the door inner parting seal 34. A portion in contact with the door inner parting seal 34 of the door panel 21 of the front door 20 may be formed in a convex and bent shape and may be in contact with the convex door inner parting seal 34 to seal a gap therebetween.

When the front door 20 and the rear door 30 are closed, the door outer parting seal 33, the door side weather strip 26, and the door inner parting seal 34 may seal a gap between the rear end of the front door 20 and the front end of the rear door 30 at an interval, e.g., at three locations, from the outside to the inside of the vehicle 1.

Figure 4:
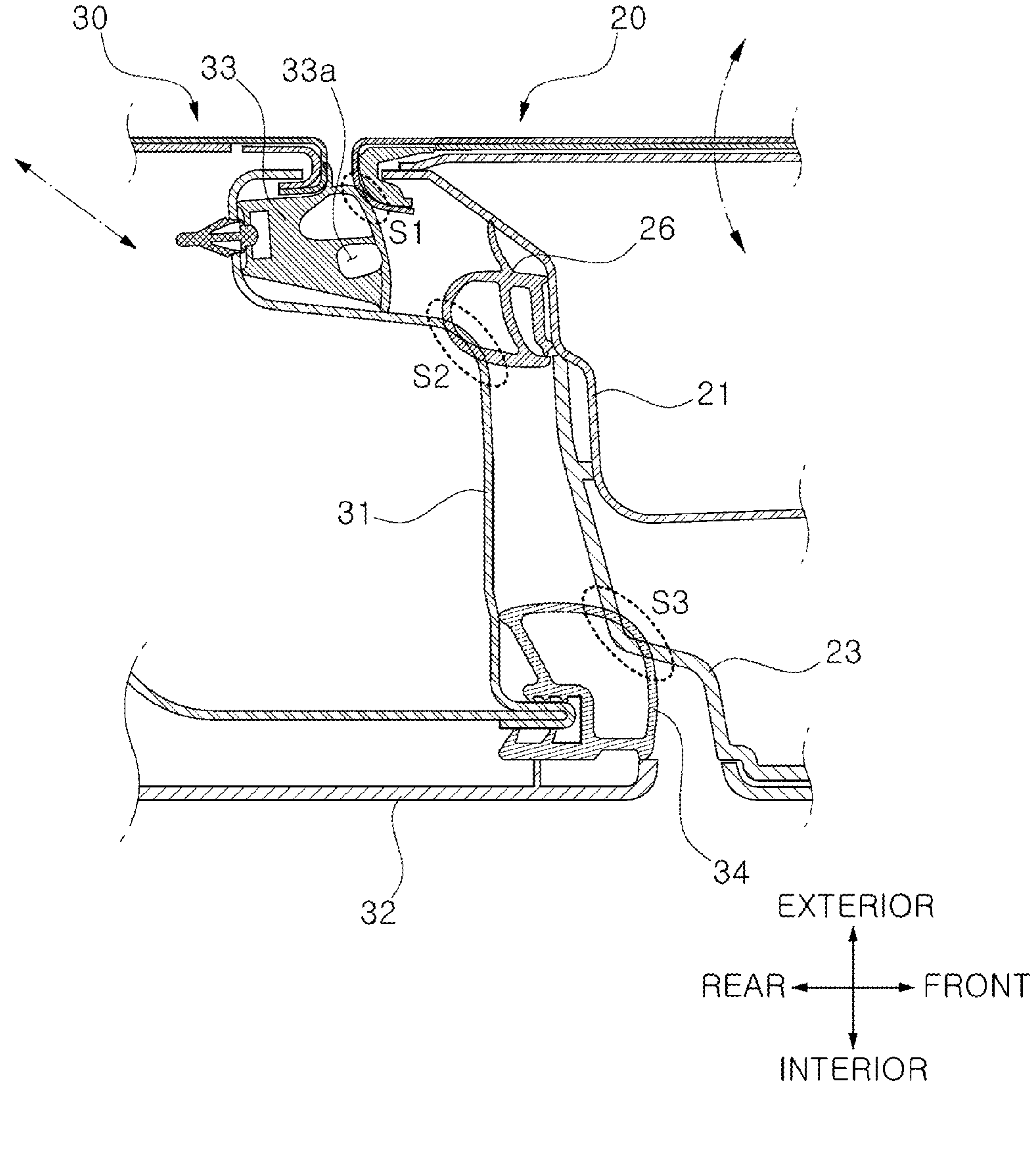
FIG. 4 is a cross-sectional view along line IV-IV in FIG. 1.
Figure 5:
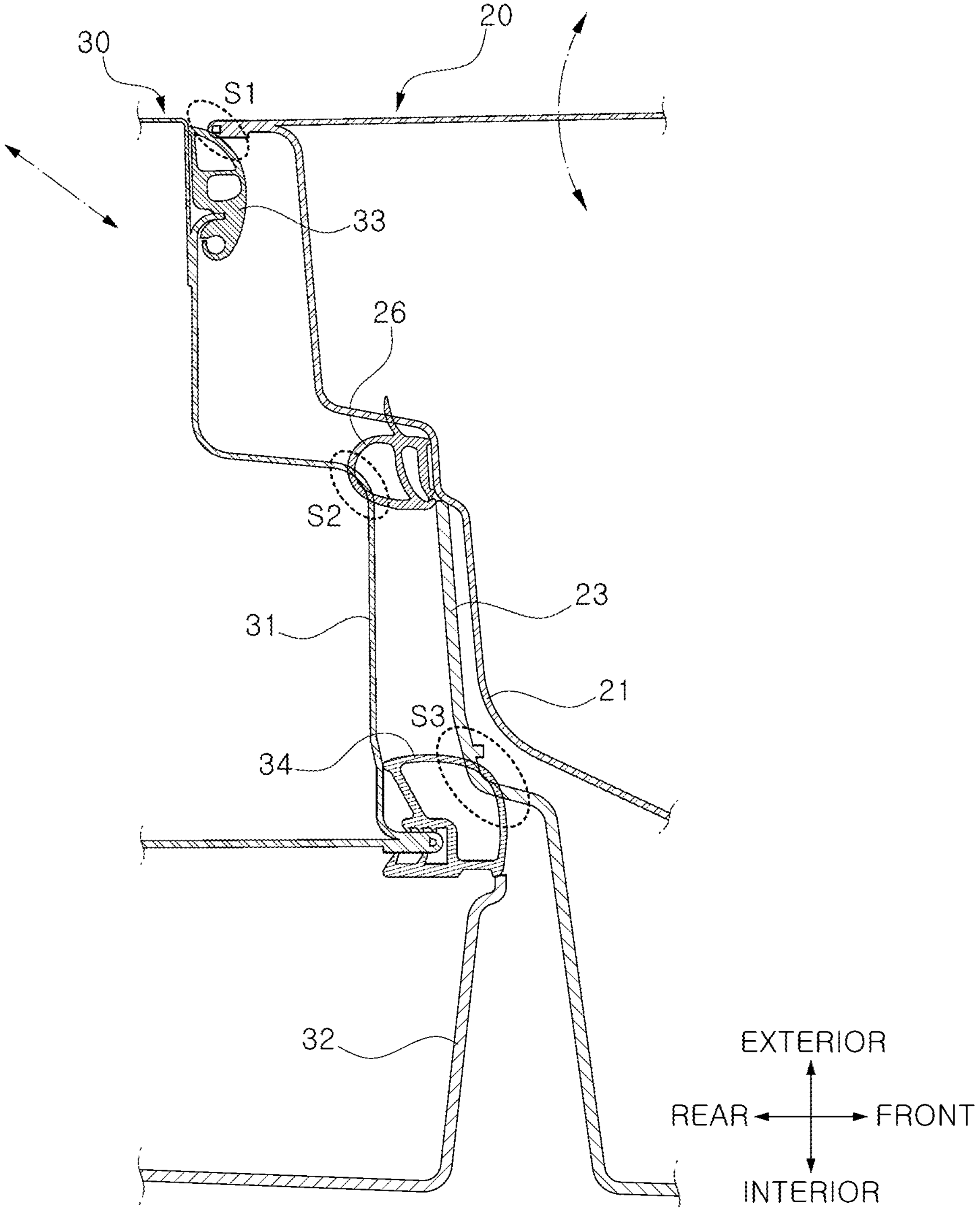
FIG. 5 is a cross-sectional view along line V-V in FIG. 1.
Figure 7:
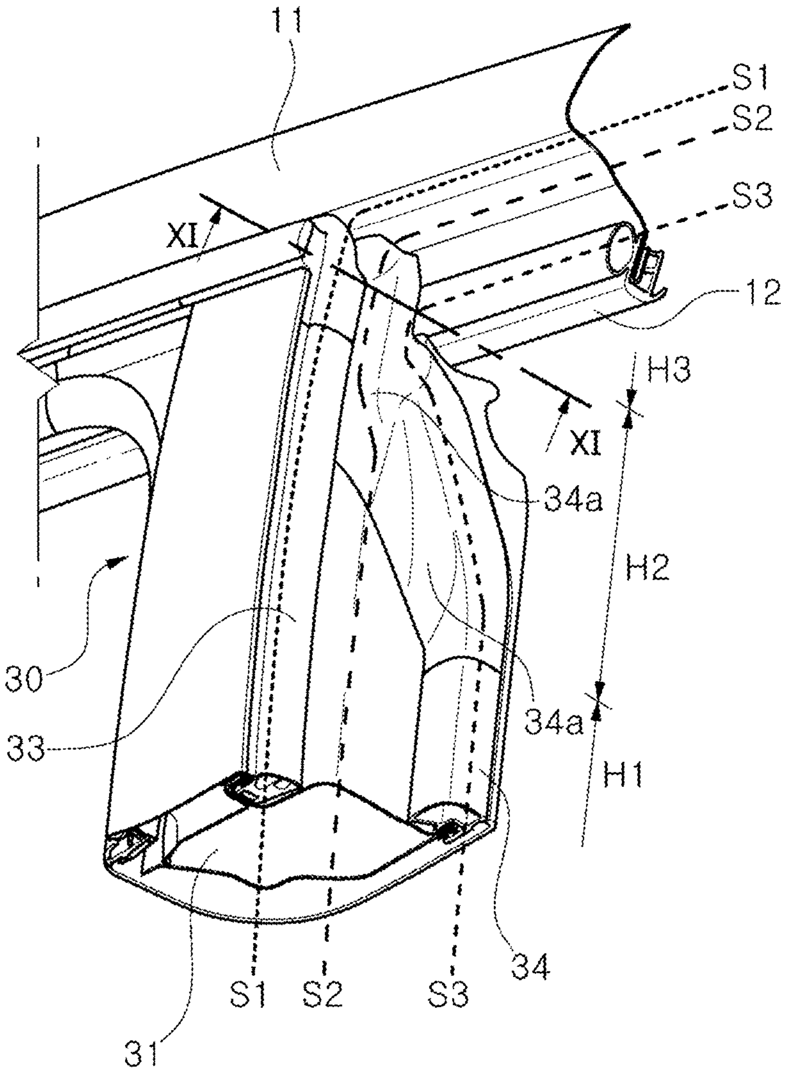
FIG. 7 is an enlarged perspective view of portion A in FIG. 2.
Figure 8:
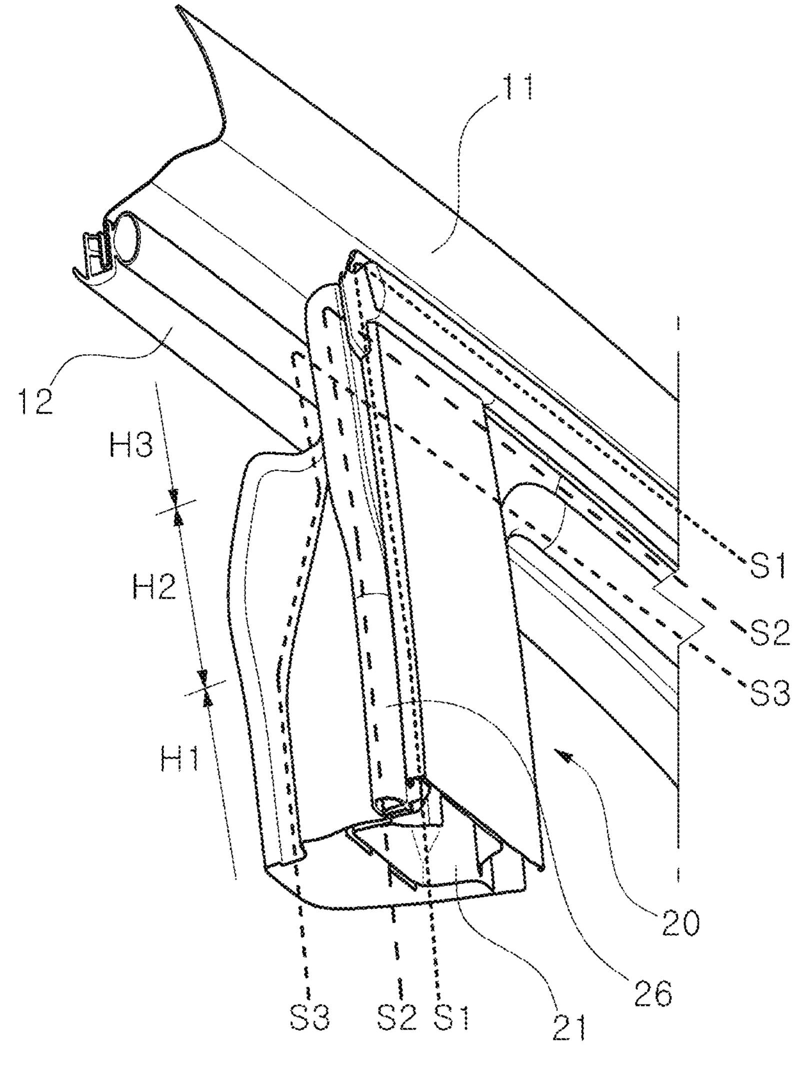
FIG. 8 is an enlarged perspective view of portion B in FIG. 2.

Referring to FIGS. 7 and 8, a location primarily sealed by the door outer parting seal 33 is denoted by line S1, a location secondarily sealed by the door side weather strip 26 is denoted by line S2, and a location tertiarily sealed by the door inner parting seal 34 is denoted by line S3. It can be seen that the gap between the front door 20 and the rear door 30 is sealed at three locations of lines S1 to S3. In FIGS. 4 and 5, the primary, secondary and tertiary sealing locations are denoted by lines S1 to S3, respectively.

The door inner parting seal 34 may be formed to converge into the door outer parting seal 33 at an upper end of the rear door 30. In other words, the door inner parting seal 34 may be installed at a predetermined interval from the door outer parting seal 33, and in a portion adjacent to the upper end of the rear door 30, the door inner parting seal 34 may be formed to have a reduced interval with the door outer parting seal 33 toward the upper end of the rear door 30, and at the upper end of the rear door 30, the door inner parting seal 34 may be formed in contact with the door outer parting seal 33.

When the door inner parting seal 34 is formed to converge into the door outer parting seal 33 toward an upper portion thereof, at an upper end of the door inner parting seal 34, the tertiary sealing action by the door inner parting seal 34 is combined with the secondary sealing action by the door side weather strip 26. Therefore, when the front door 20 and the rear door 30 are closed, a triple sealing action is performed on an upper portion of the front door 20 and an upper portion of the rear door 30.

Referring to FIGS. 7 and 8, in a section H1 below the middle of the front door 20 and the rear door 30, lines S1, S2, and S3 are disposed at predetermined intervals, but in an upper section H2, the lines S1, S2, and S3 starting to converge are shown. In addition, in an uppermost section H3, intervals of the lines S1, S2, and S3 are shown to be very narrow, and thus the door outer parting seal 33, the door side weather strip 26, and the door inner parting seal 34 that are made of a flexible material such as rubber may be deformed when both the front door 20 and the rear door 30 are closed. Therefore, the door outer parting seal 33, the door side weather strip 26, and the door inner parting seal 34 may be in contact with each other and sealed in triple.

Since the vehicle 1 does not have a center pillar, a device such as a latch should be applied between the rear end of the front door 20 and the front end of the rear door 30. A sealing space may be insufficient due to the application of the device such as the latch, but as described above, by allowing the primary to tertiary sealing to converge, the triple sealing is possible while installing the latch, and the like, thereby improving sealing performance.

Figure 2:
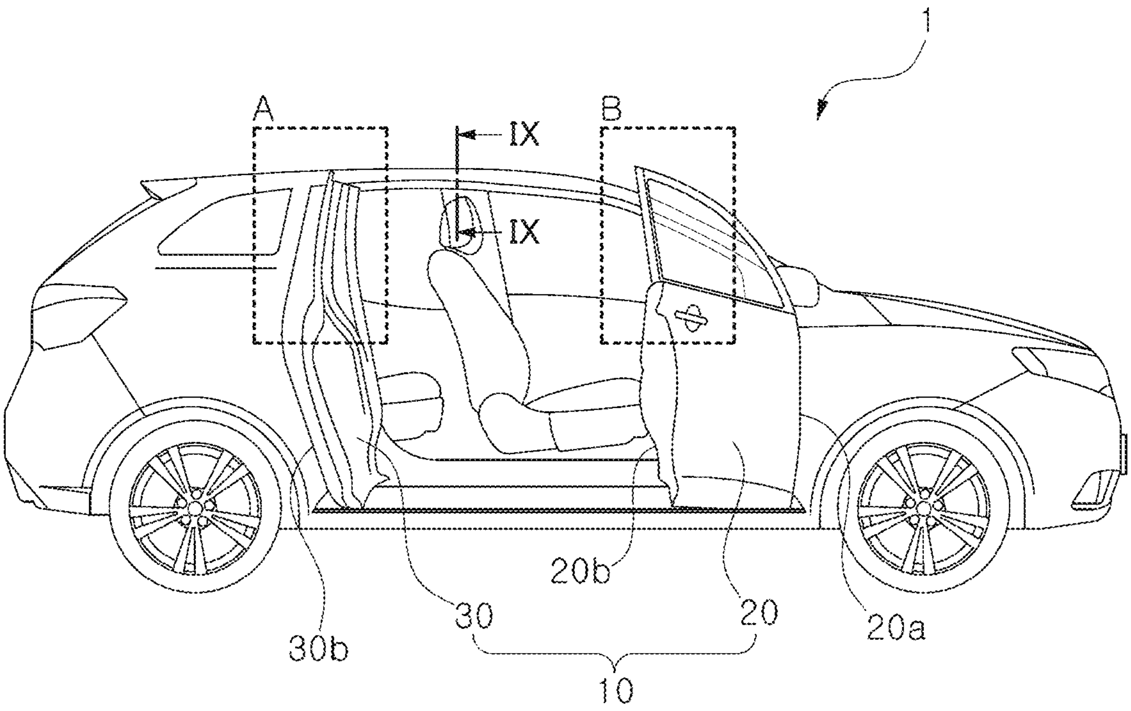
FIG. 2 is a side view showing a state in which the front door and the rear door are opened in the vehicle to which the sealing structure according to an embodiment of the present disclosure is applied.
Figure 9:
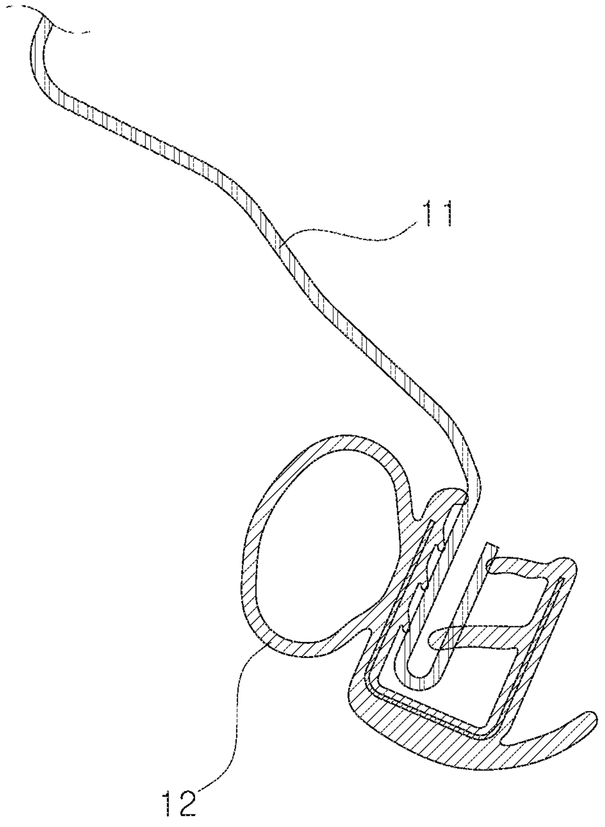
FIG. 9 is a cross-sectional view along line IX-IX in FIG. 2.

Therefore, the upper end of the rear door 30 may be sealed by a joint instead of a door panel, and a portion in which a body side weather strip 12 is mounted on a vehicle body panel 11 may be formed linearly. In other words, the vehicle body panel 11 may have a constant cross-section in a longitudinal direction of the vehicle 1 at a portion in which the rear end of the front door 20 is in contact with the upper end of the rear door 30. In other words, the cross section shown in FIG. 9 is formed not only at a location indicated by line IX-IX in FIG. 2, but also before and after the location.

For example, an opening flange on which the body side weather strip 12 is mounted may be formed linearly. Therefore, the body side weather strip 12 may be easily installed, and the body side weather strip 12 may be formed linearly when the front door 20 and the rear door 30 are opened, thereby improving an appearance.

Figure 11:
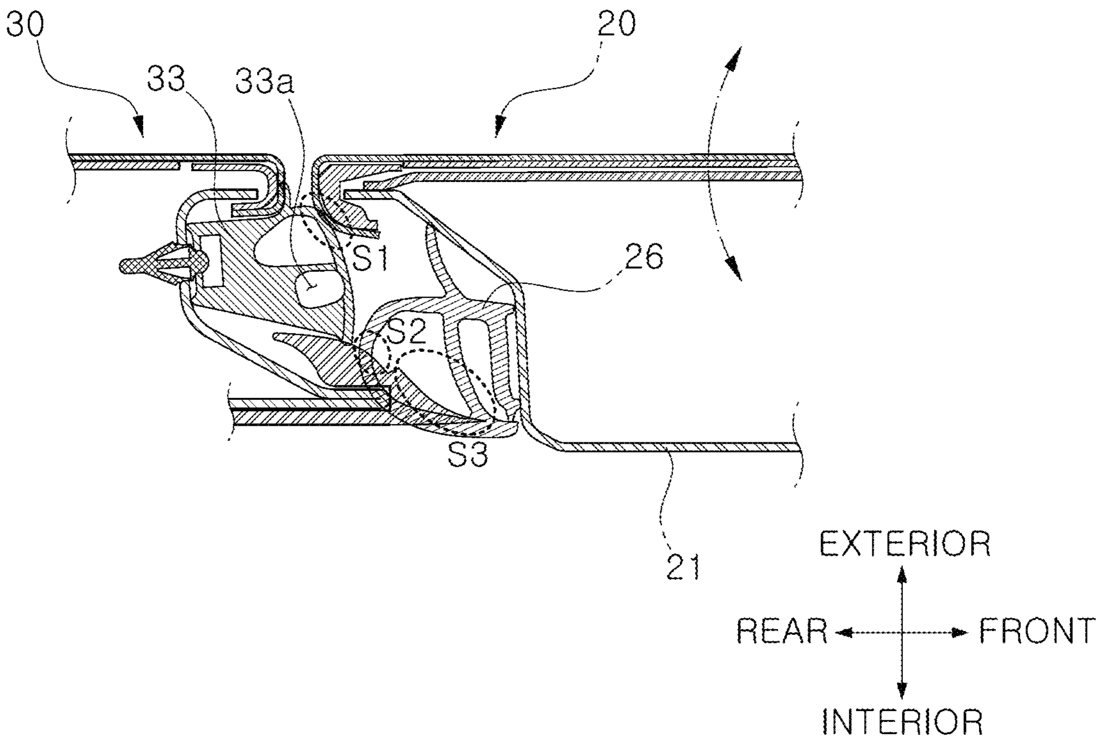
FIG. 11 is a cross-sectional view along line XI-X in FIG. 7.

Describing a cross section of the upper end of the door inner parting seal 34, the cross section may be formed to have a smaller width toward an end portion of the door inner parting seal 34. As shown in FIG. 11, the door inner parting seal 34 may be formed to have a cross section of the upper end, which has a smaller width toward an end portion in the longitudinal direction of the vehicle 1. Therefore, the cross section of the upper end of the door inner parting seal 34 may be formed in a wedge shape. Since the upper end of the door inner parting seal 34 is formed in a wedge shape, when both the front door 20 and the rear door 30 are closed, the door inner parting seal 34 may be in close contact with the door side weather strip 26, thereby improving sealing performance.

In addition, a drainage guide groove 34*a* may be formed in the door inner parting seal 34. The drainage guide groove 34*a* may be formed to have a predetermined length downward from the upper end of the door inner parting seal 34. The drainage guide groove 34*a* may be formed concavely toward the inside of the vehicle 1. Therefore, moisture flowing into the upper end of the front door 20 and the upper end of the rear door 30 may be guided to flow between the door inner parting seal 34 and the door side weather strip 26 and flow downward.

As described above, since the gap between the front door 20 and the rear door 30 is sealed at three locations, i.e., using a triple structure, it is possible to completely block noise or moisture from being introduced from the outside.

Figure 3:
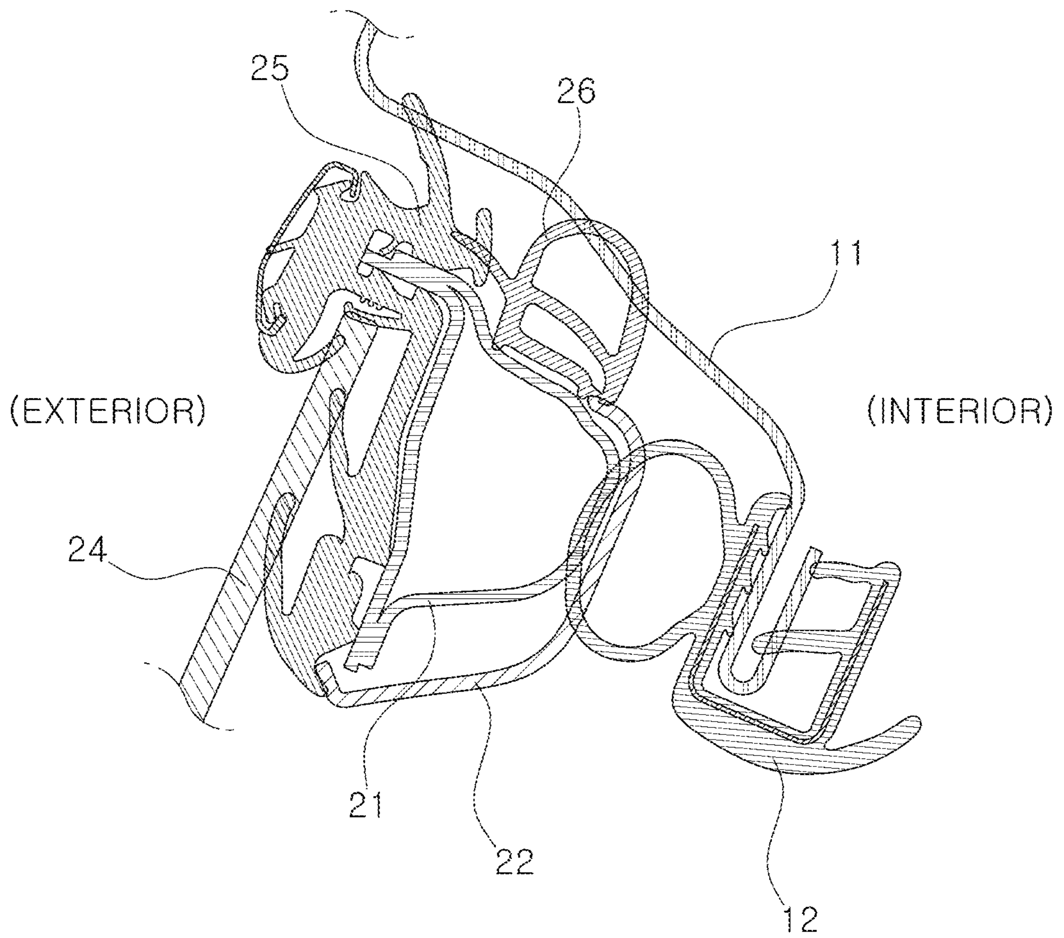
FIG. 3 is a cross-sectional view along line III-III in FIG. 1.

FIG. 3 shows a cross-sectional structure when the front door 20 is closed, and a glass run 25 supporting the door glass 24, the door side weather strip 26 installed on the door panel 21 of the front door 20, and the body side weather strip 12 installed on the vehicle body panel 11 and in contact with an inner cover 22 fitted into the door panel 21 of the front door 20 may be provided between the front door 20 and the vehicle body panel 11 to seal the gap between the upper end of the front door 20 and the vehicle body panel 11.

Such a structure may be also applied to the rear door 30.

The portion in which the front door 20 and the rear door 30 are in direct contact with the vehicle body panel 11 may be sealed at three locations by the triple structure including the body side weather strip 12, the glass run 25, and the door side weather strip 26.

However, since it is difficult to apply such a structure to the portion in which the front door 20 is in direct contact with the rear door 30, i.e., the rear end 20*b* of the front door 20 and the front end 30*b* of the rear door 30, the above-described structure may be applied.

FIGS. 4 and 5 show a cross-sectional structure of upper and lower portions of a belt line in a state in which the front door 20 and the rear door 30 are closed. A gap between the rear end of the front door 20 and the front end of the rear door 30 may be sealed with the triple structure, i.e., the door outer parting seal 33, the door side weather strip 26, and the door inner parting seal 34. However, at the upper portion of the belt line, the gap between the door outer parting seal 33, the door side weather strip 26, and the door inner parting seal 34 may be formed to be smaller than at the lower portion of the belt line.

Figure 6:
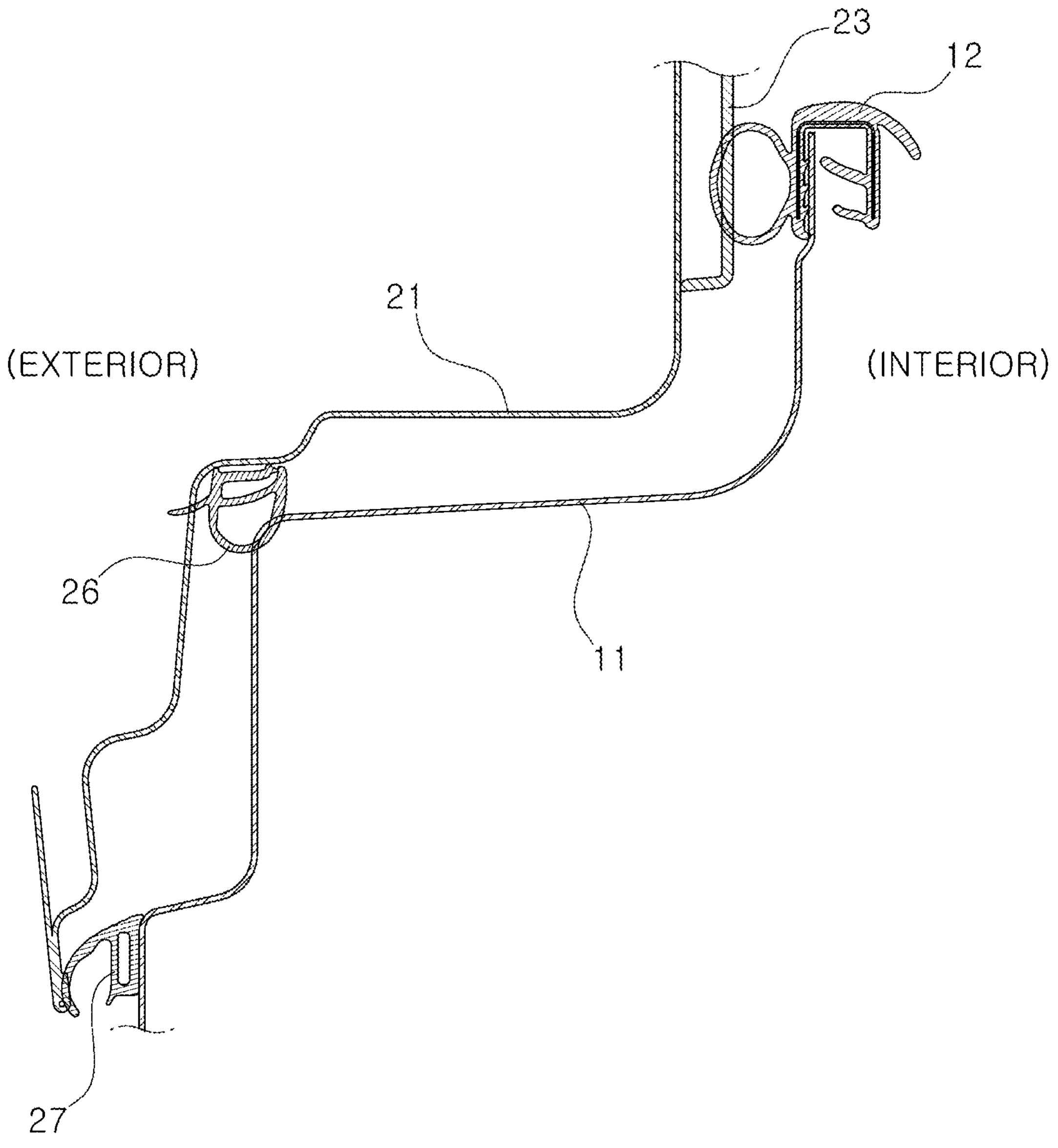
FIG. 6 is a cross-sectional view along line VI-VI in FIG. 1.

FIG. 6 shows a sealing structure between the lower end of the front door 20 and the vehicle body panel 11.

The gap between the lower end of the front door 20 and the vehicle body panel 11 may be sealed with the triple structure by the body side weather strip 12 installed on the vehicle body panel 11 and in contact with the door trim 23 of the front door 20, the door side weather strip 26 installed on the door panel 21 of the front door 20 and in contact with the vehicle body panel 11, and a lower seal 13 installed at a lower end of the vehicle body panel 11 and in contact with the front door 20.

Such a structure may be also applied to the lower end of the rear door 30.

Figure 10:
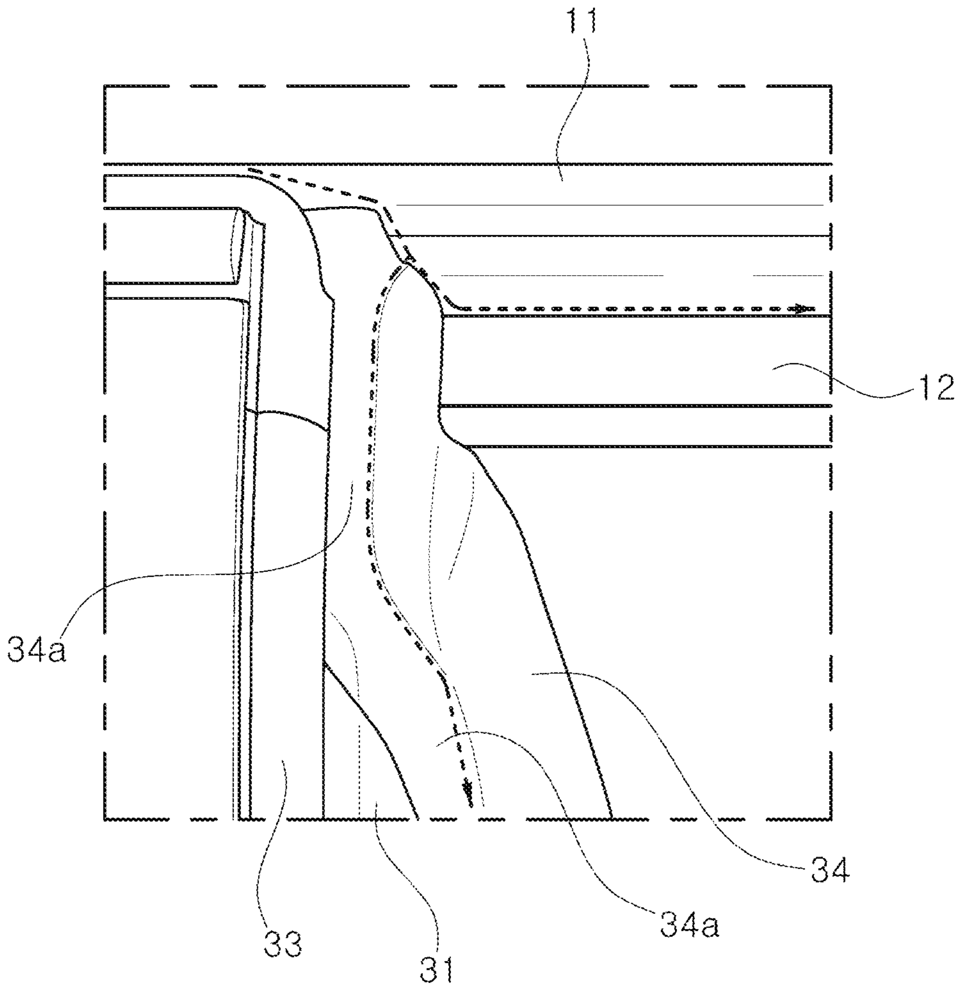
FIG. 10 is a perspective view showing a drainage path at a front end of the rear door in a vehicle to which a sealing structure according to an embodiment of the present disclosure is applied.

FIG. 10 shows a drainage path of moisture introduced through the upper ends of the front door 20 and the rear door 30.

Since the drainage guide groove 34*a* is formed on an upper portion of the door inner parting seal 34, moisture may be drained by moving downward through the space between the door inner parting seal 34 and the door side weather strip 26 along the drainage guide groove 34*a*.

The present disclosure has been described with reference to the example embodiments and the drawings, but the present disclosure is not limited thereby. The present disclosure may be carried out in various forms by those having ordinary skill in the art, to which the present disclosure pertains, within the technical spirit of the present disclosure and the scope of equivalents to the appended claims.

What is claimed is:

1. A vehicle door, the vehicle door comprising:

a first door having a first end and a second end, wherein the first end is hinge-connected to a vehicle;

a second door having a third end and a fourth end, wherein the third end is adjacent the second end of the first door when the first door and the second door are closed, and the fourth end is hinge-connected to the vehicle;

a door outer parting seal installed on the second door, wherein the door outer parting seal is adjacent to and in contact with an outer surface of the first door when the first and second doors are closed;

a door side weather strip installed on the first door and in contact with the third end of the second door when the first and second doors are closed, wherein the door side weather strip is positioned more inside the vehicle than the door outer parting seal; and a door inner parting seal installed on the second door and in contact with the first door when the first and second doors are closed, wherein the door inner parting seal is positioned more inside the vehicle than the door side weather strip, wherein when both the first door and the second door are closed, an upper end of the door side weather strip is in contact with the door outer parting seal.

2. The vehicle door of claim 1, wherein, when both the first door and the second door are closed, the door outer parting seal, the door side weather strip, and the door inner parting seal are configured to seal a gap between the second end of the first door and the third end of the second door, and the door outer parting seal, the door side weather strip, and the door inner parting seal are positioned sequentially from an outside of the vehicle to an inside of the vehicle.

3. The vehicle door of claim 2, wherein, when both the first door and the second door are closed, the door outer parting seal is in contact with a portion of the first door adjacent to an outer end portion of the first door.

4. The vehicle door of claim 2, wherein a portion of the second door which is in contact with the door side weather strip when the first and second doors are closed is formed convexly toward the door side weather strip.

5. The vehicle door of claim 2, wherein a portion of the first door which is in contact with the door inner parting seal when the first and second doors are closed is formed convexly toward the door inner parting seal.

6. The vehicle door of claim 2, wherein the door inner parting seal has a spacing from the door outer parting seal within a predetermined distance from an upper end of the second door, wherein the spacing becomes smaller toward the upper end of the second door.

7. The vehicle door of claim 6, wherein the door inner parting seal converges into the door outer parting seal at the upper end of the second door.

8. The vehicle door of claim 7, wherein, when both the first door and the second door are closed, an upper end of the door inner parting seal is in contact with the door side weather strip.

9. The vehicle door of claim 1, wherein each of the first door and the second door includes:

a glass run supporting a door glass, a door panel upon which a door side weather strip is installed, and an inner cover; and the vehicle includes a body side weather strip installed on a vehicle body panel which is adjacent the inner covers when the first and second doors are closed.

10. The vehicle door of claim 1, wherein a width of the door inner parting seal is formed to become smaller toward an end portion of the door inner parting seal.

11. The vehicle door of claim 1, wherein:

the door outer parting seal and the door inner parting seal are formed convexly toward the first door, the door side weather strip is formed convexly toward the second door, and when the first door and the second door are closed, the door outer parting seal, the door side weather strip, and the door inner parting seal are deformed to seal a gap between the first door and the second door.

12. The vehicle door of claim 1, wherein:

a spacing between the second end of the first door and the fourth end of the second door increases toward an inside of the vehicle, and a spacing between the third end of the second door and the first end of the first door decreases toward the inside of the vehicle.

13. The vehicle door of claim 1, wherein a drainage guide groove guiding moisture to flow downward between the door inner parting seal and the door side weather strip is formed in an upper portion of the door inner parting seal.

14. The vehicle door of claim 1, wherein an anti-pinch sensor installation groove in which an anti-pinch sensor is installed is formed inside the door outer parting seal.

15. The vehicle door of claim 1, wherein a vehicle body panel of the vehicle adjacent an upper end of the first door and an upper end of the second door when the first and second doors are closed has a constant cross section in a longitudinal direction of the vehicle.

16. The vehicle door of claim 1, wherein when the first and second doors are closed lower ends of the first door and the second door are each sealed by:

a body side weather strip installed on a vehicle body panel of the vehicle;

a door side weather strip in contact with the vehicle body panel; and a lower seal installed at a lower end of the vehicle body panel.

17. The vehicle door of claim 1, wherein the first door is a front door with the first end configured to rotate after sliding, and the second door is a rear door.

18. The vehicle door of claim 1, wherein the first and second doors are opened and closed in opposite directions to each other.

19. The vehicle door of claim 1, wherein the first door is a front door, and the second door is a rear door with the fourth end configured to rotate after sliding.

* * * * *